(12) United States Patent
Oota

(10) Patent No.: US 8,730,597 B2
(45) Date of Patent: May 20, 2014

(54) HOLDING APPARATUS AND OPTICAL APPARATUS

(75) Inventor: Tetsuji Oota, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 184 days.

(21) Appl. No.: 13/044,949

(22) Filed: Mar. 10, 2011

(65) Prior Publication Data
US 2011/0222148 A1 Sep. 15, 2011

(30) Foreign Application Priority Data
Mar. 12, 2010 (JP) .................................. 2010-056541

(51) Int. Cl.
*G02B 7/02* (2006.01)

(52) U.S. Cl.
USPC .......................................... 359/820; 359/822

(58) Field of Classification Search
USPC ........................................................ 359/820
See application file for complete search history.

(56) References Cited

U.S. PATENT DOCUMENTS

| | | | |
|---|---|---|---|
| 6,038,068 A | 3/2000 | Takeshi et al. | |
| 6,982,841 B2 | 1/2006 | Kino et al. | |
| 7,264,363 B2 * | 9/2007 | Griffith et al. | 359/845 |
| 7,878,665 B2 * | 2/2011 | Imoto | 353/100 |
| 2005/0078386 A1 * | 4/2005 | Takabayashi | 359/819 |
| 2006/0072219 A1 | 4/2006 | Kino et al. | |

FOREIGN PATENT DOCUMENTS

| | | |
|---|---|---|
| JP | 6-230274 A | 8/1994 |
| JP | 2004-247484 A | 9/2004 |

OTHER PUBLICATIONS

Varadarajan, K. M. et al. "Active Compliant Fixtures for Nanomanufacturing", Annual meeting of ASPE, 2004.

* cited by examiner

*Primary Examiner* — Jade R Chwasz
(74) *Attorney, Agent, or Firm* — Rossi, Kimms & McDowell LLP

(57) ABSTRACT

A holding apparatus includes a structure and configured to hold an object so that a distance from a reference point of the structure to a reference point of the object in a direction along a reference axis is kept at a constant value. The holding apparatus further includes a plurality of holding members, each supported by the structure, including an inclined surface that is inclined relative to a plane orthogonal to the reference axis, and configured to hold the object via the inclined surface. The inclined surfaces are inclined so that the distance falls within a tolerance even if temperature of the object and the plurality of holding members change.

11 Claims, 9 Drawing Sheets

| DESIGN PATTERN | L13 | α3 | Ci3 | L11 | α1 | Ct1 | R1 | θ1 |
|---|---|---|---|---|---|---|---|---|
| 1 | 300 | 1.43E-05 | 0.5033 | 200 | 8.80E-06 | 0.4993 | 225 | 76.00098285 |
| 2 | 220 | 1.43E-05 | 0.5033 | 200 | 8.80E-06 | 0.4993 | 400 | 51.02549214 |
| 3 | 180 | 1.17E-05 | 0.5033 | 200 | 8.80E-06 | 0.4993 | 400 | 30.05729462 |
| 4 | 220 | 1.17E-05 | 0.5033 | 200 | 1.00E-07 | 0.4993 | 200 | 65.42924484 |
| 5 | 60 | 1.17E-05 | 0.5033 | 50 | 1.00E-07 | 0.4993 | 200 | 30.83219514 |

F I G. 10
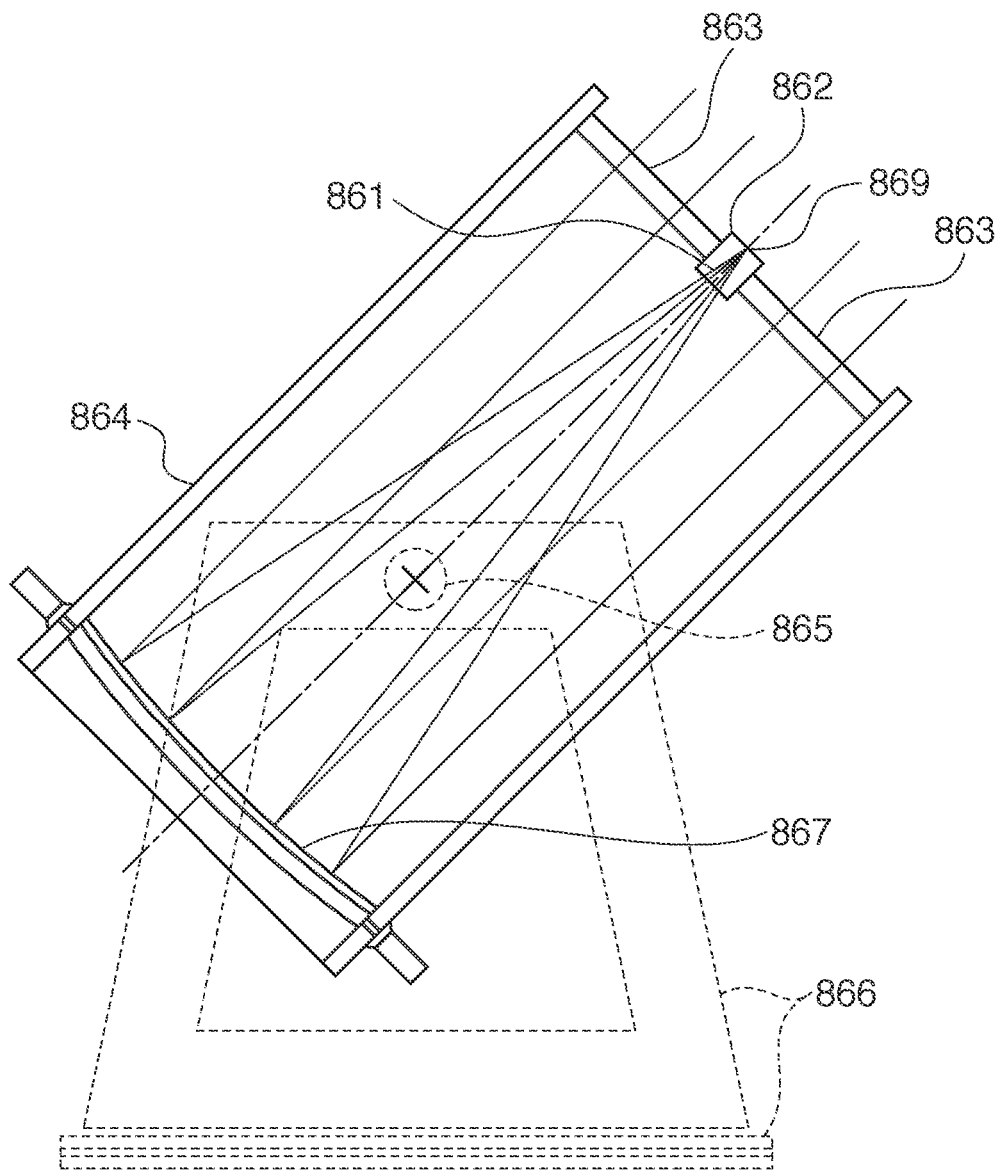

HOLDING APPARATUS AND OPTICAL APPARATUS

BACKGROUND OF THE INVENTION

1. Field of the Invention

The present invention relates to a holding apparatus and an optical apparatus.

2. Description of the Related Art

High positional accuracy is required for the relative positions of the constituent elements of an optical apparatus such as an astronomical telescope or a precision instrument such as an artificial satellite. Examples of the constituent elements of a precision instrument include a main body structure, an optical element, a sensor, and an actuator, and extremely high positional accuracy is required in particular for the optical element.

In general, the environmental temperature of a precision instrument differs greatly between the manufacturing/assembly environment and the usage environment. Specifically, in the case of an astronomical telescope, its manufacturing/assembly environment is often at a temperature in the neighborhood of 20° C., and its usage environment is often at a temperature in the neighborhood of 0° C. In the case of an artificial satellite, its usage environment is at the temperature in space, that is, at a temperature in the neighborhood of −270° C., and there also occurs a local temperature increase in the main body structure under irradiation with sunlight.

Such a temperature change leads to deformation of the constituent elements in accordance with their thermal expansion coefficients and accordingly causes a large misalignment in the relative positions of the main body structure and the optical element. Many constituent elements have a limited selection of materials in order to achieve their desired performance. For example, it is conceivable that a low thermal expansion material such as Invar may be used for a holding apparatus that holds an optical element, but in the case where glass constituting the optical element has a high thermal expansion coefficient, a titanium alloy or the like will be used in response thereto for the holding apparatus. In this case, misalignment due to a temperature change is inevitable and positioning repeatability cannot be ensured for each environment. In addition, distortion due to thermal stress occurs at coupling portions (joints) of the constituent elements. Note that such misalignment and distortion are factors that significantly degrade the performance of the optical element.

In view of this, in order to reduce distortion due mainly to temperature changes, technology for holding an optical element using kinematic mounts has been proposed in Japanese Patent Laid-Open No. 2004-247484 and by Varadarajan K. M. and Culpepper M. L. in "Active Compliant Fixtures for Nanomanufacturing", Annual meeting of ASPE, 2004 (Document 1). Kinematic mounts are a holding method that constrains the degrees of freedom of a held rigid element as a rigid body just enough (that is, constrains the position of the rigid element in six degrees of freedom). With kinematic mounts, for example, one element that is provided with three spherical surfaces and another element that is provided with three V-shaped grooves are positioned by engagement of the spherical surfaces and the V-shaped grooves. Kinematic mounts have the property of not transmitting distortion and having excellent positioning repeatability.

However, since kinematic mounts uniquely determine the position of a target element, they may position the element at a position displaced considerably from the intended position in the case where the element has a large variation in temperature. For this reason, in the technology disclosed in Japanese Patent Laid-Open No. 2004-247484, a configuration has been proposed in which, in the case where deformation occurs due to a temperature change, a ball constituting a kinematic mount between a component targeted for holding and a structure is allowed to move via a movable groove component with a predetermined one degree of freedom. This enables the component targeted for holding to be held without being displaced in a plane even if deformation occurs due to a temperature change. However, with the technology disclosed in Japanese Patent Laid-Open No. 2004-247484, the positioning of the component targeted for holding cannot be performed along the reference axis.

Meanwhile, Document 1 discloses technology for arranging a component targeted for holding at an arbitrary position by controlling (changing) the angles of three V-shaped grooves that respectively hold three balls in the case where a shift in the reference position occurs due to deformation caused by a temperature change. However, since the technology disclosed in Document 1 necessitates a sensor for detecting the amount of shift of the reference position and an actuator for changing the angles of the V-shaped grooves, the configuration becomes complicated and increases in cost. Furthermore, power consumption and heat generation of the sensor and the actuator may have an adverse effect on the performance of a precision instrument and, in addition, high-precision positioning becomes difficult if deformation occurs in the basis for mounting the sensor and the actuator itself.

SUMMARY OF THE INVENTION

The present invention provides a holding apparatus that is advantageous in terms of accuracy of positioning of an object, under a temperature change.

According to one aspect of the present invention, there is provided a holding apparatus including a structure and configured to hold an object so that a distance from a reference point of the structure to a reference point of the object in a direction along a reference axis is kept at a constant value, the holding apparatus including a plurality of holding members, each being supported by the structure, including an inclined surface that is inclined relative to a plane orthogonal to the reference axis, and being configured to hold the object via the inclined surface, wherein the inclined surfaces are inclined so that the distance falls within a tolerance even if temperature of the object and the plurality of holding members change.

Further aspects of the present invention will become apparent from the following description of exemplary embodiments with reference to the attached drawings.

BRIEF DESCRIPTION OF THE DRAWINGS

FIG. 10 is a diagram showing the configuration of a reflecting telescope according to a fourth embodiment of the present invention.

DESCRIPTION OF THE EMBODIMENTS

Figure 1A:
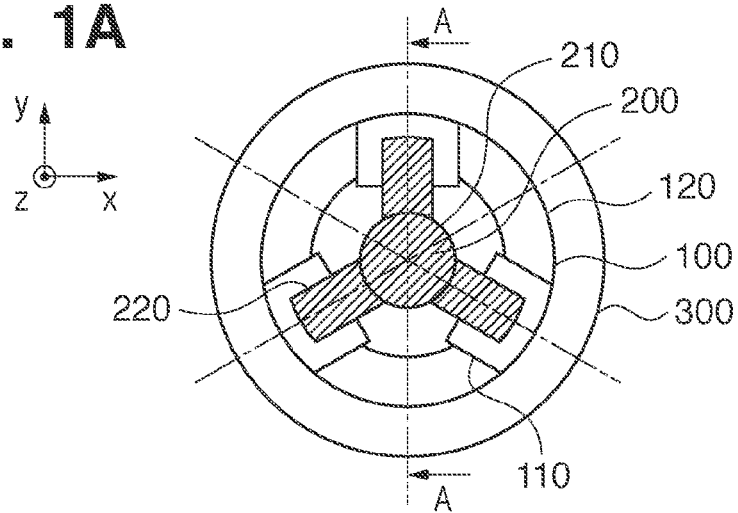
FIGS. 1A to 1C are diagrams showing the configuration of a holding apparatus according to a first embodiment of the present invention.

Preferred embodiments of the present invention will be described below with reference to the accompanying drawings. Note that the same reference numerals denote the same members throughout the drawings, and a repetitive description thereof will not be given.

<Comparative Example>

Figure 9A:
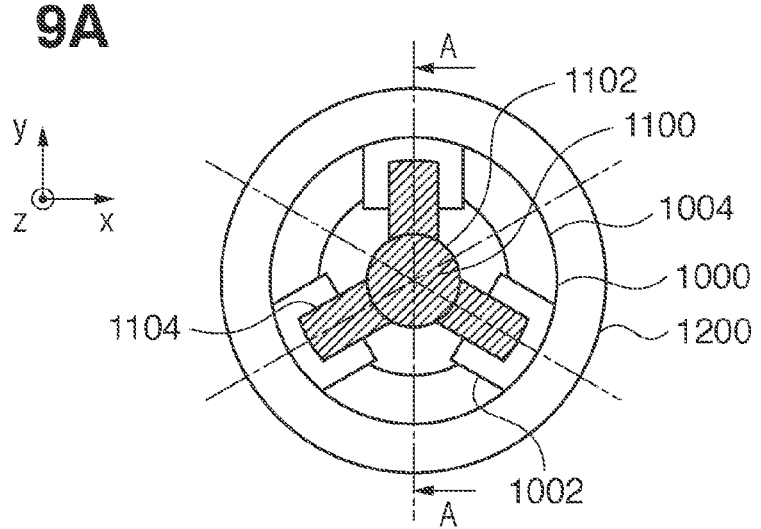
FIGS. 9A to 9C are diagrams showing the configuration of a general holding apparatus.
Figure 9B:
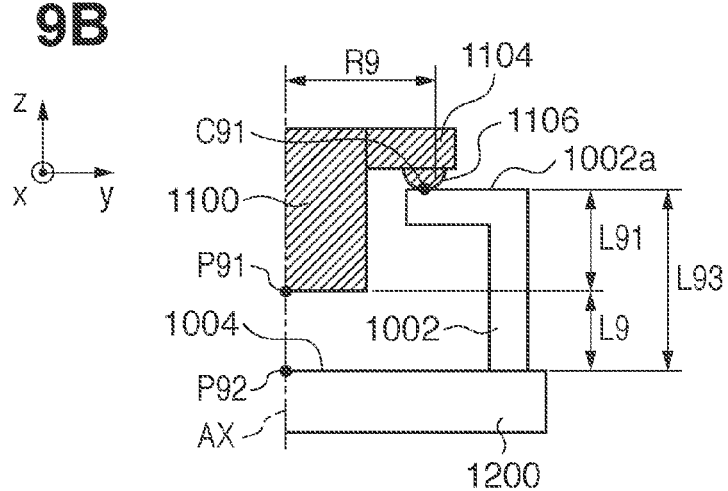

A general holding apparatus 1000 is described with reference to FIGS. 9A to 9C as a comparative example of a holding apparatus, which is one aspect of the present invention. FIG. 9A is a top view of the holding apparatus 1000, and FIG. 9B is a cross-sectional view of the holding apparatus 1000 taken along line A-A in FIG. 9A. Note that constituent elements that are unnecessary for the explanation are not shown in FIG. 9B.

The holding apparatus 1000 holds an optical element 1100, which is a member targeted for holding, in a structure 1200 of a precision instrument. The optical element 1100 includes a lens barrel 1102 and three lens barrel flanges 1104 that are arranged at regular intervals (spaced 120 degrees) on the periphery of the lens barrel 1102. The optical element 1100 is held by the holding apparatus 1000 via spherical surfaces (kinematic balls) 1106 provided on the three lens barrel flanges 1104.

The holding apparatus 1000 includes three holding units 1002, each including a contact surface 1002a that is in contact with the corresponding spherical surface 1106, and holding the optical element 1100 via a contact point C91 between the contact surface 1002a and the spherical surface 1106. Note that in FIGS. 9B and FIG. 9C, in order to simplify the description, a single contact point C91 between the holding unit 1002 (contact surface 1002a) and the spherical surface 1106 is shown.

The holding apparatus 1000 also includes a substrate portion 1004 that defines the relative positional relationship of the three holding units 1002, and the holding apparatuas 1000 is connected to the structure 1200 via the substrate portion 1004. The holding apparatus 1000 defines the position of the optical element 1100 relative to the structure 1200 by defining the positions (contact points C91) at which the spherical surfaces 1106 are held.

The optical element 1100 has a first reference point P91 on a reference axis AX. The structure 1200 has a second reference point P92 on the reference axis AX. Here, let L91 be the distance between a plane that includes the first reference point P91 and is perpendicular to the reference axis AX and each of the contact points C91 (that is, a distance along the reference axis AX between the first reference point P91 and each of the contact points C91). Also, let L93 be the distance between a plane that includes the second reference point P92 and is perpendicular to the reference axis AX and each of the contact points C91 (that is, a distance along the reference axis AX between the second reference point P92 and each of the contact points C91). In this case, a distance L9 along the reference axis AX between the first reference point P91 and the second reference point P92 is expressed by Equation 1 below.

$$L9 = L93 - L91 \quad \text{(Equation 1)}$$

The distance L9 needs to be kept constant with high precision because the optical performance of the optical element 1100 is degraded if there is an error in the distance L9.

Figure 9C:
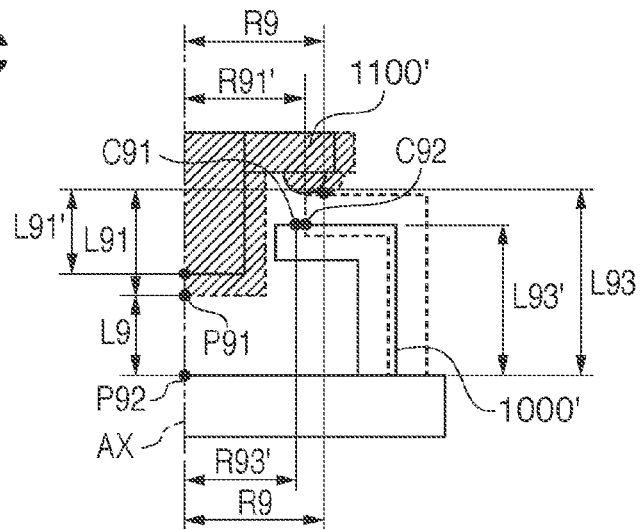

FIG. 9C schematically shows states of the optical element 1100 and the holding aparatus 1000 before and after a temperature change, in the case where the environmental temperature of the holding apparatus 1000 has decreased by $\Delta T°$ C. (in the case where the environmental temperature has changed from a first temperature to a second temperature). In FIG. 9C, the state of the optical element 1100 and the holding apparatus 1000 before the temperature change, that is, the same state as in the FIG. 9B, is shown by broken lines, and the state of an optical element 1100' and a holding apparatus 1000' after the temperature change is shown by solid lines.

When the environmental temperature has changed, the optical element 1100 and the holding apparatus 1000 are changed in shape (deformed) in accordance with their respective thermal expansion coefficients $\alpha_1$ and $\alpha_3$ ($\alpha_1 < \alpha_3$). Here, since the optical element 1100 and the holding apparatus 1000 have axisymmetric shapes and are constrained to each other axisymmetrically as well, their shapes in the xy-plane are also changed axisymmetrically.

Focusing on the deformation in the z axis direction in FIG. 9C, the deformation (contraction) of the holding apparatus 1000 causes the distance along the reference axis AX between the second reference point P92 and the contact point C91 to change from L93 to L93'. Also, the deformation (contraction) of the optical element 1100 causes the distance along the reference axis AX between the first reference point P91 and the contact point C91 to change from L91 to L91'. Accordingly, L93' and L91' are expressed respectively by Equations 2 and 3 below.

$$L93' = L93 - (L93 \cdot \alpha_3 \cdot \Delta T) \quad \text{(Equation 2)}$$

$$L91' = L91 - (L91 \cdot \alpha_1 \cdot \Delta T) \quad \text{(Equation 3)}$$

Meanwhile, focusing on the deformation in the y axis direction in FIG. 9C, the deformation (contraction) of the optical element 1100 causes the distance between the reference axis AX and the contact point in a direction perpendicular to the reference axis AX to change from R9 to R91'. Also, the deformation (contraction) of the holding apparatus 1000 causes the distance between the reference axis AX and the contact point in the direction perpendicular to the reference axis AX to change from R9 to R93'. R91' is expressed by Equation 4 below, using a shape coefficient Ct in accordance with the shape of the optical element 1100. Note that the shape coefficient Ct may be obtained theoretically or may be derived from FEM analysis, for example.

$$R91' = R9 - R9 \cdot Ct \cdot \alpha_1 \cdot \Delta T \quad \text{(Equation 4)}$$

A distance AR9 between the contact point C91 before the temperature change and the contact point C92 after the temperature change in the direction perpendicular to the reference axis AX is expressed by equation 5 below.

$$\Delta R9 = R91' - R93' \quad \text{(Equation 5)}$$

At this time, the spherical surface 1106 is not displaced in the z axis direction. Accordingly, the distance L9' along the reference axis AX between the first reference point P91 and the second reference point P92 after the temperature change is expressed by Equation 6 below.

$$L9'=L93'-L91'$$ (Equation 6)

A change in the distance in the direction along the reference axis AX (z axis direction) results in a misalignment of the optical element 1100 relative to the structure 1200 and causes degradation in the optical performance of the optical element 1100. For this reason, L9'=L9 needs to be satisfied in order not to cause degradation in the optical performance of the optical element 1100.

A difference between Equations 1 and 6 is expressed by Equation 7 below, using Equations 2 and 3.

$$L9'-L9=-L93 \cdot \alpha_3 \cdot \Delta T + L91 \cdot \alpha_1 \cdot \Delta T$$ (Equation 7)

If the right side of Equation 7 is 0, no degradation occurs in the optical performance of the optical element 1100. Accordingly, the condition shown by Equation 8 below needs to be satisfied.

$$L93 \cdot \alpha_3 = L91 \cdot \alpha_1$$ (Equation 8)

In Equation 8, L91 and L93 are uniquely determined by defining the distance L9 along the reference axis AX between the first reference point P91 and the second reference point P92. However, L91 and L93 have few degrees of freedom because they are determined by the optical design. Furthermore, the thermal expansion coefficient α1 is substantially limited by the material of the optical element 1100, and the thermal expansion coefficient α3 has few degrees of freedom when mechanical properties are prioritized.

In this way, in the general holding apparatus 1000, L91, L93, $\alpha_1$, and $\alpha_3$ (that is, the parameters in Equation 8) have few degrees of freedom and therefore it is extremely difficult to satisfy the condition shown by Equation 8. In other words, it is difficult for the general holding apparatus 1000 to keep constant the relative distance between the first reference point P91 and the second reference point P92 before and after a temperature change, thus causing degradation in the optical performance of the optical element 1100.

Although the above has been a description of the case where the environmental temperature of the holding appratus1000 has decreased by ΔT° C., it is to be understood that a similar problem also occurs in the case where the environmental temperature of the holding apparatus 1000 has increased because in that case the optical element 1100 and the holding apparatus 1000 expand.

<First Embodiment>

Figure 1B:
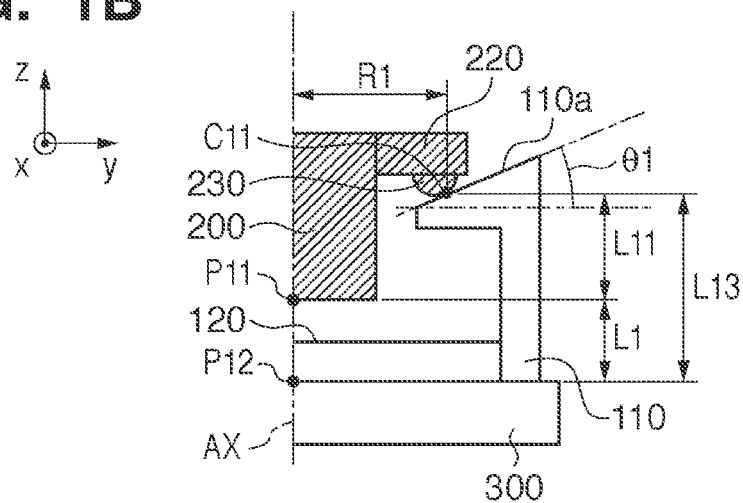
Figure 1C:
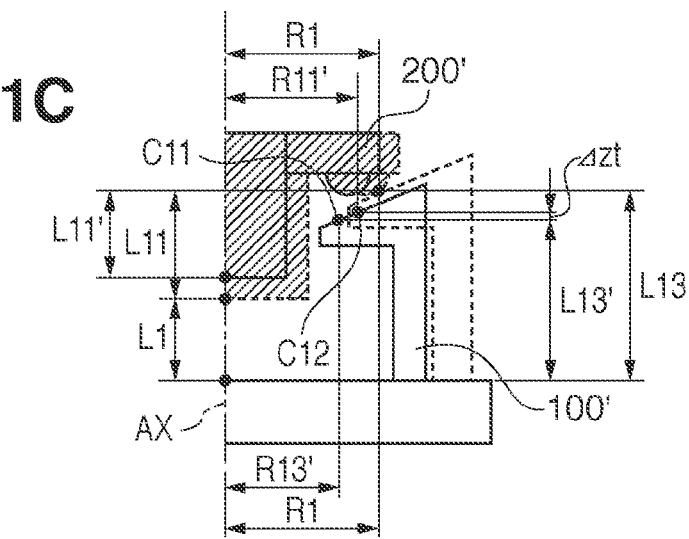

A description is given of a holding apparatus 100 according to a first embodiment of the present invention with reference to FIGS. 1A to 1C. FIG. 1A is a top view of the holding apparatus 100, and FIG. 1B is a cross-sectional view of the holding appratus 100 taken along line A-A shown in FIG. 1A. Note that constituent elements that are unnecessary for the explanation are not shown in FIG. 1B.

The holding apparatus 100 holds an optical element 200, which is a member targeted for holding, in a structure 300 of a precision instrument while keeping constant (at a fixed value) the relative distance between a first reference point P11 of the optical element 200 and a second reference point P12 of the structure 300. The optical element 200 includes a lens barrel 210, and three lens barrel flanges 220 that are arranged at regular intervals (spaced 120 degrees) on the periphery of the lens barrel 210. Note that the three lens barrel flange 220 are each provided with a spherical surface (spherical surface portion composed of a kinematic ball) 230.

The holding appratus 100 includes a plurality of (three, in the present embodiment) holding units 110, each including an inclined surface 110a having a gradient $\theta_1$ (inclination angle $\theta_1$) relative to a plane perpendicular to a reference axis AX that connects the first reference point P11 and the second reference point P12. The holding units 110 each hold the optical element 200 via a contact point C11 between the inclined surface 110a and the corresponding spherical surface 230. Note that in FIGS. 1B and 1C, in order to simplify the description, a single contact point C11 between the holding unit 110 (inclined surface 110a) and the spherical surface 230 is shown. However, as discussed later, the holding units 110 may be configured with kinematic mounts in order not to transmit distortion to the optical element 200 and to constrain the position of the optical element 200. With this configuration, the holding apparatus 100 constrains the degrees of freedom of the optical element 200 as a rigid body just enough (that is, constrains the position of the optical element 200 in six degrees of freedom).

The holding apparatus 100 also includes a substrate portion 120 that defines the relative positional relationship of the three holding units 110, and the holding apparatus 100 is connected to the structure 300 via the substrate portion 120. The holding apparatus 100 defines the position of the optical element 200 relative to the structure 300 by defining the positions (contact points C11) at which the spherical surfaces 230 are held.

Here, let L11 be the distance between a plane that includes the first reference point P11 and is perpendicular (orthogonal) to the reference axis AX and each of the contact points C11 (that is, the distance along the reference axis AX between the first reference point P11 and each of the contact points C11). Also, let L13 be the distance between a plane that includes the second reference point P12 and is perpendicular to the reference axis AX and each of the contact points C11 (that is, the distance along the reference axis AX between the second reference point P12 and each of the contact points C11). In this case, a distance L1 along the reference axis AX between the first reference point P11 and the second reference point P12 is expressed by Equation 9 below.

$$L1=L13-L11$$ (Equation 9)

FIG. 1C schematically shows states of the optical element 200 and the holding apparatus 100 before and after a temperature change, in the case where the the environmental temperature of the holding apparatus 100 has decreased by ΔT° C. In FIG. 1C, the state of the optical element 200 and the holding apparatus 100 before the temperature change, that is, the same state as in FIG. 1B, is shown by broken lines, and the state of an optical element 200' and a holding apparatus 100' after the temperature change is shown by solid lines.

When the environmental temperature has changed, the optical element 200 and the holding apparatus 100 are changed in shape (deformed) in accordance with their respective thermal expansion coefficients $\alpha_1$ and $\alpha_3$ ($\alpha_1 < \alpha_3$). Here, since the optical element 200 and the holding apparatus 100 have axisymmetric shapes and are constrained axisymmetrically as well, their shapes in the xy-plane are also changed axisymmetrically.

Focusing on the deformation in the z axis direction in FIG. 1C, the deformation (contraction) of the holding apparatus 100 causes the distance along the reference axis AX between the second reference point P12 and the contact point C11 to change from L13 to L13'. Also, the deformation (contraction) of the optical element 200 causes the distance along the reference axis AX between the first reference point P11 and the contact point C11 to change from L11 to L11'. Accordingly, L13' and L11' are expressed respectively by Equations 10 and 11 below.

$$L13'=L13-(L13 \cdot \alpha_3 \cdot \Delta T) \quad \text{(Equation 10)}$$

$$L11'=L11-(L11 \cdot \alpha_3 \cdot \Delta T) \quad \text{(Equation 11)}$$

Meanwhile, focusing on the deformation in the y axis direction in FIG. 1C, the deformation (contraction) of the optical element 200 causes the distance between the reference axis AX and the contact point in a direction perpendicular to the reference axis AX to change from R1 to R11'. R11' is expressed by Equation 12 below, using a shape coefficient $Ct_1$ in accordance with the shape of the optical element 200. Note that the shape coefficient $Ct_1$ may be obtained theoretically or may be derived from FEM analysis, for example.

$$R11'=R1-R1 \cdot Ct_1 \cdot \alpha_1 \cdot \Delta T \quad \text{(Equation 12)}$$

Also, the deformation (contraction) of the holding apparatus 100 causes the distance between the reference axis AX and the contact point in the direction perpendicular to the reference axis AX to change from R1 to R13'. R13' is expressed by Equation 13 below, using a shape coefficient $Ct_3$ in accordance with the shape of the holding apparatus 100. Note that the shape coefficient $Ct_3$ may be obtained theoretically or may be derived from FEM analysis, for example.

$$R13'=R1-R1 \cdot Ct_3 \cdot \alpha_3 \cdot \Delta T \quad \text{(Equation 13)}$$

At this time, the spherical surface 230 moves along the gradient $\theta_1$ on the inclined surface 110a of the holding unit 110. Specifically, the spherical surface 230 moves in the z axis direction as well by shrinking in the y axis direction and is brought into contact with the inclined surface 110a at a contact point C12. In other words, the contact point is at different positions in the inclined surface before and after the temperature change. The contact point C12 after the temperature change is a point that is shifted by $\Delta zt$ in the z axis direction from the contact point C11 before the temperature change. $\Delta zt$ is expressed by Equation 14 below.

$$\Delta zt=(R11'-R13') \cdot \tan \theta_1 \quad \text{(Equation 14)}$$

Accordingly, a distance L1' along the reference axis AX between the first reference point P11 and the second reference point P12 after the temperature change is expressed by Equation 15 below.

$$L1'=L13'-L11'+\Delta zt \quad \text{(Equation 15)}$$

Here, L1'=L1 needs to be satisfied in order not to cause degradation in the optical performance of the optical element 200.

A difference between Equations 9 and 15 is expressed by Equation 16 below, using Equations 10 to 14.

$$L1'-L1=\{-L13 \cdot \alpha_3+L11 \cdot \alpha_1+(-R1 \cdot Ct_1 \cdot \alpha_1+R1 \cdot Ct_3 \cdot \alpha_3) \tan \theta_1\}\Delta T \quad \text{(Equation 16)}$$

In the present embodiment, misalignment of the optical element 200 and accordingly degradation in the optical performance of the optical element 200 before and after a temperature change are prevented by setting the gradient $\theta_1$ of the inclined surface 110a so that the right side of Equation 16 will be 0. Specifically, the gradient $\theta_1$ of the inclined surface 110a needs to satisfy Equation 17 below with respect to the plane perpendicular to the reference axis AX.

$$\theta_1=\tan^{-1}\{(L13 \cdot \alpha_3-L11 \cdot \alpha_1/(R1 \cdot (Ct_3 \cdot \alpha_3-Ct_1 \cdot \alpha_1))\} \quad \text{(Equation 17)}$$

Note that the gradient $\theta_1$ is uniquely determined by the relative positions of the optical element 200 and the structure 300 and therefore, the holding apparatus 100 is capable of maintaining unchanged the relative positions of the optical element 200 and the structure 300 even if there is a large difference in environmental temperature between the manufacturing/assembly environment and the usage environment.

Also, since the gradient $\theta_1$ is constant irrespective of a temperature change, the holding apparatus 100 is capable of always keeping constant the relative positions of the optical element 200 and the structure 300 even if there is a large change in environmental temperature.

In this way, the holding apparatus 100 according to the present embodiment keeps constant the distance along the reference axis AX between the first reference point P11 and the second reference point P12 by allowing the spherical surfaces 230 and the inclined surfaces 110a to be in contact with one another at different contact points in the inclined surfaces before and after a temperature change. Therefore, the holding apparatus 100 can prevent misalignment of the optical element 200 and, accordingly, degradation in the optical performance of the optical element 200 before and after a temperature change.

Figures 2, 3:
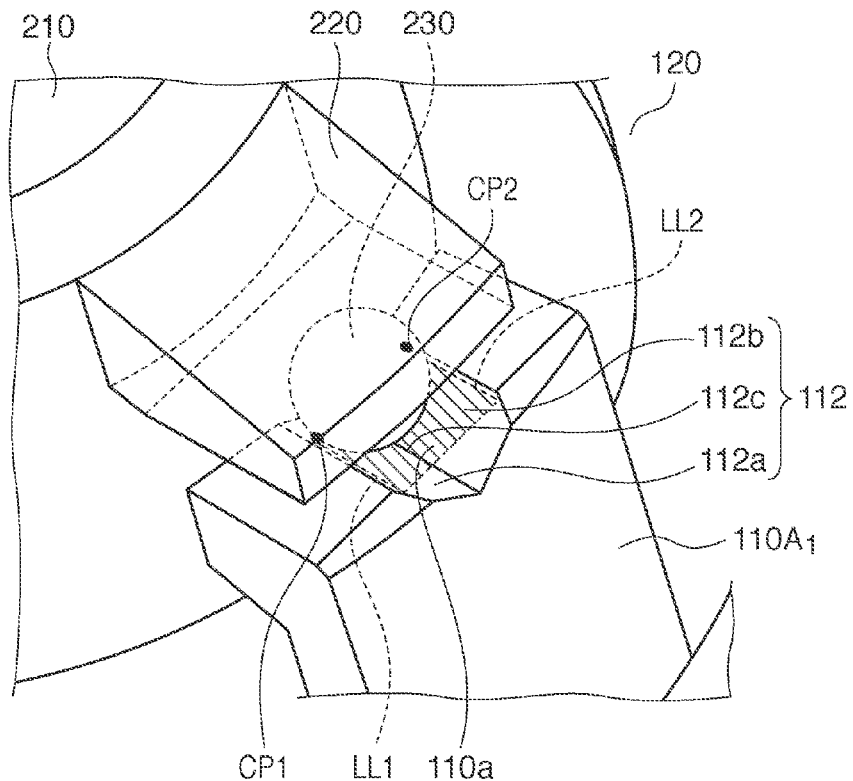
FIG. 2 is a diagram showing concrete design examples of the holding apparatus shown in FIGS. 1A to 1C.
FIG. 3 is a diagram showing a holding unit (first holding unit) configured with a kinematic mount.

FIG. 2 is a diagram showing concrete design examples of the holding apparatus 100. FIG. 2 shows the gradient $\theta_1$ of the inclined surface 110a for five design patterns (design patterns 1 to 5) in which L13, $\alpha_3$, $Ct_3$, L11, $\alpha_1$, $Ct_1$, and R1 respectively differ. For example, in design pattern 1, the gradient $\theta_1$ of the inclined surface 110a is 76° C., and in design pattern 5, the gradient $\theta_1$ of the inclined surface 110a is 31° C. It is assumed that the material for the holding apparatus 100 is stainless steel (with a thermal expansion coefficient $\alpha_3$ of $1.43 \times 10^{-5}$ ppm), and the material for the optical element 200 is a titanium alloy (with a thermal expansion coefficient $\alpha_1$ of $8.8 \times 10^{-6}$ ppm). It is also assumed that the holding apparatus 100 and the optical element 200 are annular in shape, and the holding apparatus 100 and the optical element 200 have a shape coefficient of 0.5.

As described above, the three holding units 110 may each be configured with a kinematic mount. FIG. 3 is a diagram showing one of the holding units 110 (first holding unit 110A₁) configured with a kinematic mount. Note that in FIG. 3, the lens barrel flange 220 arranged on the periphery of the lens barrel 210 is shown as semi-transparent.

As shown in FIG. 3, the holding unit 110A₁ has a V-shaped groove (first V-shaped groove) 112 formed therein that is configured by a first plane 112a, a second plane 112b, and a ridge line 112c formed by the first plane 112a and the second plane 112b. A spherical surface (first spherical surface portion) 230 provided in the lens barrel flange 220 is in contact with the V-shaped groove 112 at two points, specifically, it is in contact with the V-shaped groove 112 at a contact point CP1 in the first plane 112a and a contact point CP2 in the second plane 112b. In this way, the holding unit 110 with the V-shaped groove 112 formed therein constrains two degrees of freedom of the optical element 200 having the spherical surface 230.

When the spherical surface 230 moves due to a change in environmental temperature while being in contact with the V-shaped groove 112 at the contact points CP1 and CP2, that is, while having two degrees of freedom constrained, the contact points CP1 and CP2 move along two parallel straight lines LL1 and LL2, respectively. In other words, the loci of the contact points CP1 and CP2 when the spherical surface 230 moves along the V-shaped groove 112 form the two straight lines LL1 and LL2, respectively. The inclined surface 110a of the holding unit 110A₁ is defined by a plane that includes the two straight lines LL1 and LL2. Note that in the case where the V-shaped groove 112 is symmetrical about a plane that include the ridge line 112c and the reference axis AX, the V-shaped groove 112 may be formed using the angle of the ridge line 112c as a gradient of the inclined surface 110a because the two straight lines LL1 and LL2 and the ridge line 112c are parallel to one another.

Also, although not shown, the same follows for another one of the three holding units 110 (second holding unit), that is, a V-shaped groove (second V-shaped groove) is formed that is in contact with a spherical surface (second spherical surface portion) provided in the corresponding lens barrel flange 220 at two contact points. The inclined surface of the second holding unit is defined by a plane that includes two straight lines formed respectively by the loci of the two contact points when the second spherical surface moves along the second V-shaped groove. The same also follows for the remaining one of the three holding units 110 (third holding unit), that is, a V-shaped groove (third V-shaped groove) is formed that is in contact with a spherical surface (third spherical surface portion) provided in the corresponding lens barrel flange 220 at two contact points. The inclined surface of the third holding unit is defined by a plane that includes two straight lines formed respectively by the loci of the two contact points when the third spherical surface moves along the third V-shaped groove.

Figure 4:
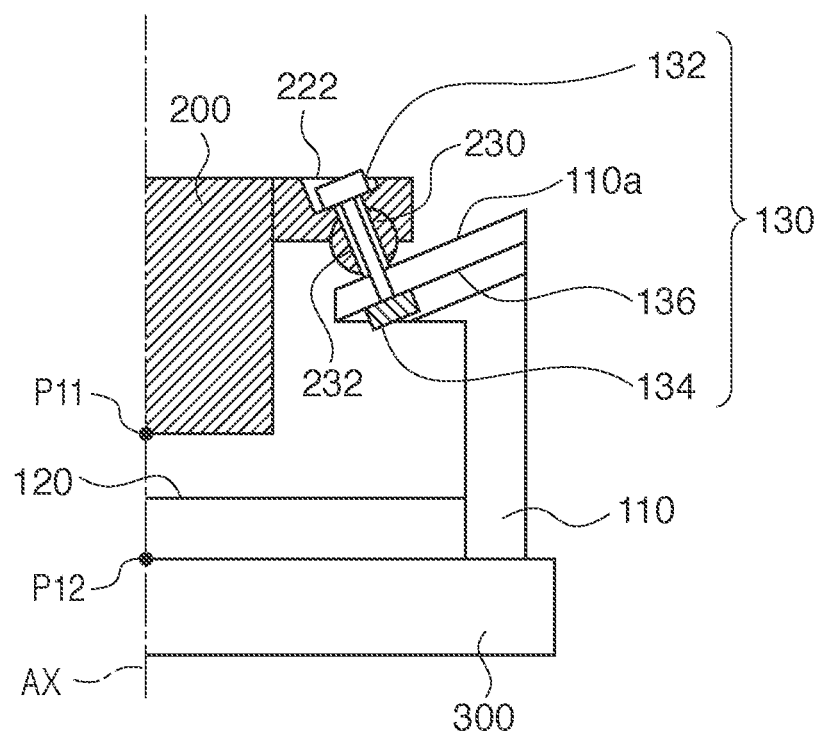
FIG. 4 is a diagram showing the structure of a preload application unit of the holding apparatus shown in FIGS. 1A to 1C.

Furthermore, as shown in FIG. 4, the holding apparatus 100 may include a preload application unit 130 that applies a preload to the optical element 200 in a direction perpendicular to the inclined surface 110a in a state where the optical element 200 is held. The preload application unit 130 serves as a pressing unit that presses the optical element and the inclined surface against each other in the direction perpendicular to the inclined surface 110a. This prevents misalignment of the optical element 200 from occurring due to vibrations or shocks.

Referring to FIG. 4, the preload application unit 130 includes, for example, a bolt 132, a nut 134, and a slot 136. The bolt 132 is tightened into the nut 134 in the slot 136 formed in the holding unit 110 via a through hole 222 formed in the lens barrel flange 220 and a through hole 232 formed in the spherical surface 230. Note that the through holes 222 and 232 are formed so as to allow the bolt 132 to perpendicularly face the inclined surface 110a in order to apply a preload only in the direction perpendicular to the inclined surface 110a of the holding unit 110 (that is, in order not to apply a preload in directions other than the direction perpendicular to the inclined surface 110a). When the environmental temperature has changed, the bolt 132 and the nut 134, while continuing to apply the preload, cause the spherical surface 230 to move in contact with the inclined surface 110a, so no distortion occurs in the optical element 200.

Also, in the case where a preload is applied to the optical element 200 in the direction perpendicular to the inclined surface 110a, the contact point between the spherical surface 230 and the inclined surface 110a may be a plane rather than a point, although this is not a problem because the amount of that contact is very small (that is, the point is merely a very small plane).

In the present embodiment, the spherical surfaces 230 of the optical element 200 move relative to the inclined surfaces 110a of the holding units 110. However, similar effects can also be achieved even if the lens barrel flanges 220 each include an inclined surface having a gradient relative to a plane perpendicular to the reference axis AX, and spherical surfaces formed in the holding units 110 move relative to the inclined surfaces.

It is also preferable that friction is minimized as much as possible and wear due to sliding is reduced on the spherical surfaces 230 of the optical element 200 and the inclined surfaces 110a (V-shaped grooves) of the holding units 110. For this reason, the spherical surfaces 230 of the optical element 200 and the inclined surfaces 110a (V-shaped grooves) of the holding units 110 may be subjected to processing such as fluororesin coating or diamond-like carbon coating in order to reduce the friction coefficient and wear.

<Second Embodiment>

Figure 5A:
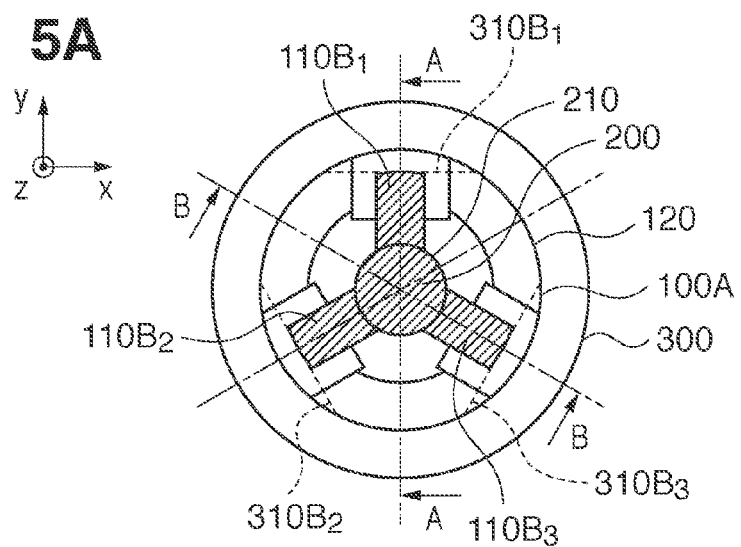
FIGS. 5A to 5C are diagrams showing the configuration of a holding apparatus according to a second embodiment of the present invention.
Figure 5B:
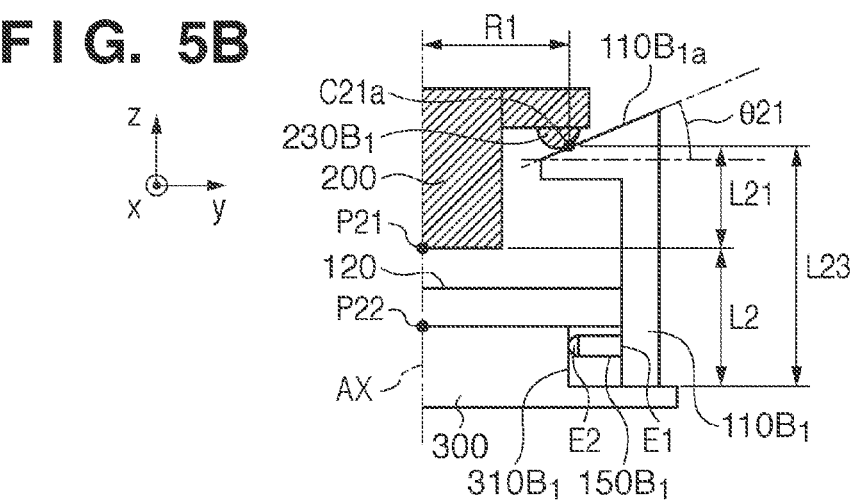
Figure 5C:
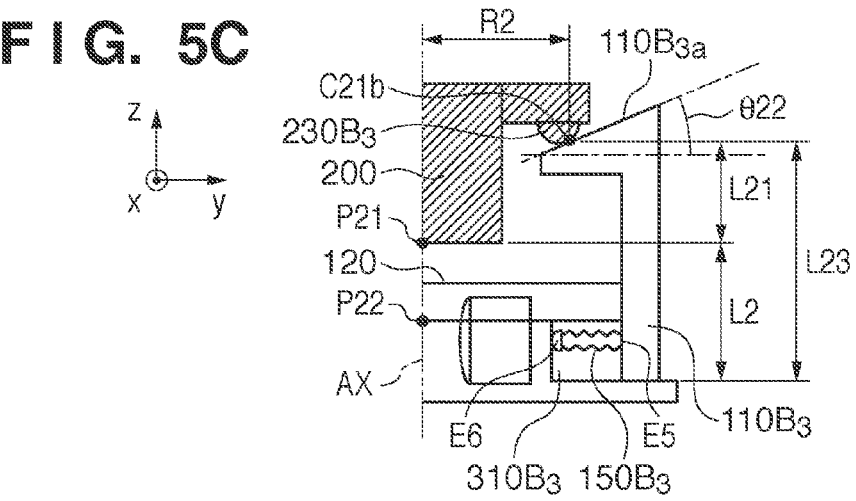

A description is given of a holding apparatus 100A according to a second embodiment of the present invention with reference to FIGS. 5A to 5C. In the present embodiment, the position of the holding apparatus 100A is kinematically constrained relative to the structure 300. FIG. 5A is a top view of the holding apparatus 100A, and FIG. 5B is a cross-sectional view of the holding apparatus 100A taken along line A-A in FIG. 5A. FIG. 5C is a cross-sectional view of the holding apparatus 100A taken along line B-B in FIG. 5A. Note that constituent elements that are unnecessary for the explanation are not shown in FIGS. 5B and 5C.

The structure 300 includes a first reference plane $310B_1$, a second reference plane $310B_2$, and a third reference plane $310B_3$ that are provided respectively for a first holding unit $110B_1$, a second holding unit $110B_2$, and a third holding unit $110B_3$ as references to mount the holding apparatus 100A. In the present embodiment, although the first reference plane $310B_1$, the second reference plane $310B_2$, and the third reference plane $310B_3$ are planes configured as stepped portions of the structure 300, those reference planes may be cylindrical surfaces or spherical surfaces as long as the position of the holding apparatus 100A can be constrained just enough. However, in the case where the first reference plane $310B_1$, the second reference plane $310B_2$, and the third reference plane $310B_3$ are cylindrical surfaces, a mechanism for determining a reference angle may be provided because the rotational degree of freedom around the z axis cannot be constrained.

The first holding unit $110B_1$ includes a first rigid member $150B_1$ having a first end E1 and a second end E2. The first rigid member $150B_1$ is coupled to the first holding unit $110B_1$ at its first end E1 and is in contact with the first reference plane $310B_1$ at its second end E2. Similarly, the second holding unit $110B_2$ includes a second rigid member $150B_2$ having a third end and a fourth end (see FIGS. 6A and 6B). The second rigid member $150B_2$ is coupled to the second holding unit $110B_2$ at its third end and is in contact with the second reference plane $310B_2$ at its fourth end. The third holding unit $110B_3$ includes a spring member (compression spring) $150B_3$ having a fifth end E5 and a sixth end E6. The spring member $150B_3$ is coupled to the third holding unit $110B_3$ at its fifth end E5 and is in contact with the third reference plane $310B_3$ at its sixth end E6. Note that the first rigid member $150B_1$ and the second rigid member $150B_2$ each constrain one degree of freedom of the holding apparatus 100A relative to the first reference plane $310B_1$ and the second reference plane $310B_2$, respectively. On the other hand, the spring member $150B_3$, which is configured by, for example, a coil spring, a plunger (fluid spring), or a plate spring, has a degree of freedom only in a direction of displacement of the spring relative to the third reference plane $310B_3$ (a direction perpendicular to the reference axis AX). The spring member $150B_3$, however, constrains the holding apparatus 100A by a preload created by the spring force. In this way, the position of the holding apparatus 100A relative to the structure 300 is determined by the first rigid member $150B_1$, the second rigid member $150B_2$, and the spring member $150B_3$. Note that the spring member $150B_3$ may be provided with a guide that has a degree of freedom in only a single axial direction because it is conceivable that the spring member $150B_3$ is displaced significantly in the direction of displacement of the spring.

The first holding unit $110B_1$ holds the optical element 200 via a contact point C21a between an inclined surface $110B_1a$ having a gradient (angle) $\theta_{21}$ relative to the plane perpendicular to the reference axis AX and a first spherical surface $230B_1$ of the optical element 200. Similarly, the second holding unit $110B_2$ holds the optical element 200 via a contact point between an inclined surface having a gradient (angle) $\theta_{21}$ relative to the plane perpendicular to the reference axis AX and a second spherical surface of the optical element 200. The third holding unit $110B_3$ holds the optical element 200 via a contact point C21b between an inclined surface $110B_3a$ having a gradient (angle) $\theta_{22}$ relative to the plane perpendicular to the reference axis AX and a third spherical surface $230B_3$ of the optical element 200.

Figure 6A:
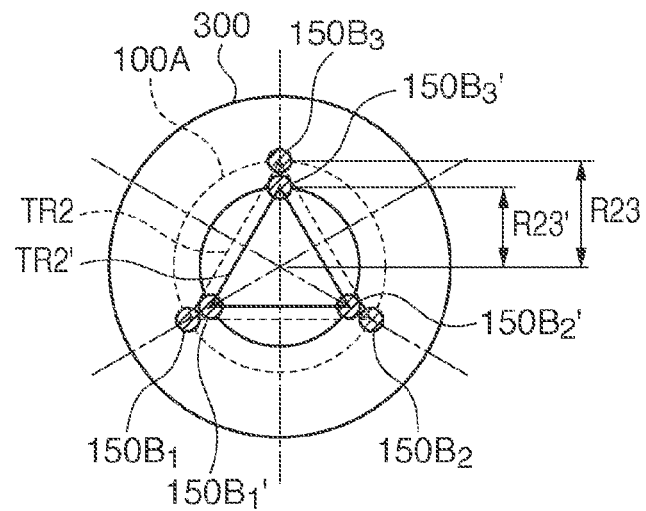
FIGS. 6A to 6C are diagrams showing the positional relationship between the holding apparatus and the structure in the case where the environmental temperature of the holding apparatus shown in FIGS. 5A to 5C has changed.
Figure 6B:
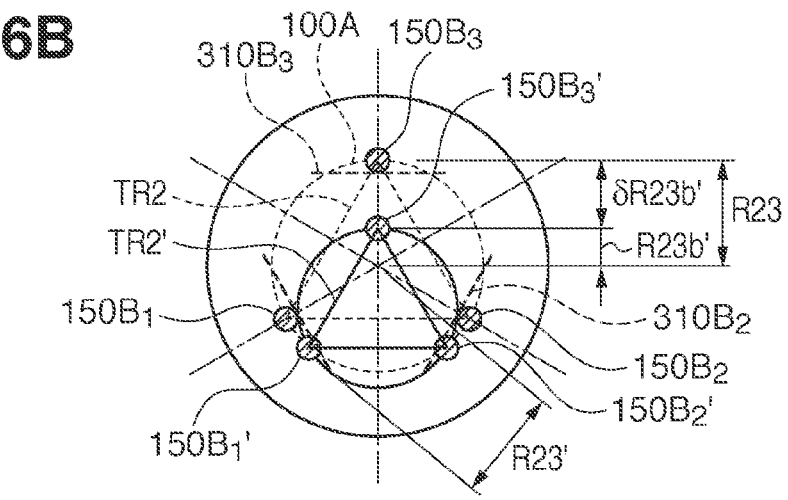
Figure 6C:
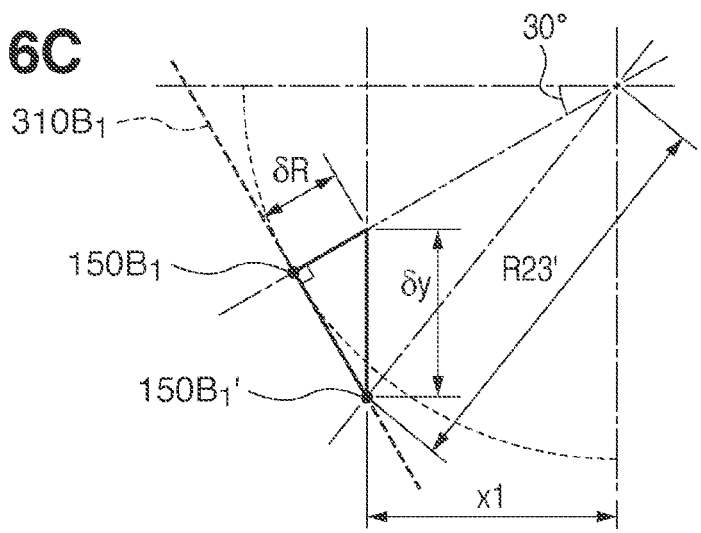

FIGS. 6A to 6C are diagrams showing the positional relationship between the holding apparatus 100A and the structure 300 in the case where the environmental temperature of the holding apparatus 100A has decreased by $\Delta T°$ C. FIG. 6A shows the case where the holding apparatus 100A is not constrained by the first reference plane $310B_1$, the second reference plane $310B_2$, and the third reference plane $310B_3$ of the structure 300. FIG. 6B shows the case where the holding apparatus 100A is constrained by the first reference plane $310B_1$, the second reference plane $310B_2$, and the third reference plane $310B_3$ of the structure 300. Reference character TR2 denotes a triangle formed by three contact points of the first rigid member $150B_1$, the second rigid member $150B_2$, and the spring member $150B_3$ with the first reference plane $310B_1$, the second reference plane $310B_2$, and the third reference plane $310B_3$, respectively, before the temperature change. Reference character TR2' denotes a triangle formed by three contact points of a first rigid member $150B_1'$, a second rigid member $150B_2'$, and a spring member $150B_3'$ with the first reference plane $310B_1$, the second reference plane $310B_2$, and the third reference plane $310B_3$, respectively, after the temperature change.

Referring to FIG. 6A, when the environmental temperature has decreased by $\Delta T°$ C., the first rigid member $150B_1$, the second rigid member $150B_2$, and the spring member $150B_3$ shrink rotationally symmetrically to the reference axis AX, and the triangle formed by the three contact points changes from TR2 to TR2'. At this time, the holding apparatus 100A shrinks in a direction perpendicular to the reference axis AX (radial direction), and its radius changes from R23 to R23'.

Referring to FIG. 6B, on the other hand, when the environmental temperature has decreased by $\Delta T°$ C., the first rigid member $150B_1$ and the second rigid member $150B_2$ move along the first reference plane $310B_1$ and the second reference plane $310B_2$, respectively. The spring member $150B_3$ is deformed in the direction perpendicular to the reference axis AX (radial direction) and thereby avoids distortion due to deformation of the holding apparatus 100A. At this time, the radial distances between the reference axis AX and the first and second rigid members $150B_1$ and $150B_2$ are defined by the first reference plane $310B_1$ and the second reference plane $310B_2$ and are therefore unchanged at R23. However, the spring member $150B_3$ is significantly displaced in the direction perpendicular to the reference axis AX (radial direction), and its radial distance is changed from R23 to R23b'.

When the radius has changed from R23 to R23' as shown in FIG. 6A, the amount of that change $\delta R$ is expressed by Equation 18 below.

$$\delta R = R23 - R23' \quad \text{(Equation 18)}$$

Also, consider the case where the first rigid member $150B_1$ and the second rigid member $150B_2$ are defined respectively by the first reference plane $310B_1$ and the second reference plane $310B_2$ as shown in FIG. 6B. In this case, the amount of change of the spring member $150B_3$ in the radial direction, $\delta R23b'$, is defined as the sum of $\delta R$ and a y-axis component $\delta y$ of the amount of travel of the first rigid member $150B_1$ (second rigid member $150B_2$), and is thus expressed by Equation 19 below.

$$\delta R23b' = \delta y + \delta R \quad \text{(Equation 19)}$$

Here is a description of the y-axis component $\delta y$ of the amount of travel of the first rigid member $150B_1$ with reference to FIG. 6C. If there is no first reference plane $310B_1$, the first rigid member $150B_1$ is deformed by $\delta R$ in the direction perpendicular to the reference axis AX (radial direction). However, if the first reference plane $310B_1$ exists, the first rigid member $150B_1$ cannot be deformed in the radial direction and thus moves along the first reference plane $310B_1$. Accordingly, as shown in FIG. 6C, the first rigid member $150B_1$ moves along the first reference plane $310B_1$ so as to maintain a distance x1 in the x axis direction, and moves by $\delta y$ in the y axis direction. Note that from a geometrical standpoint, $\delta y$ is expressed by Equation 20 below.

$$\delta y = 2\delta R \quad \text{(Equation 20)}$$

Also, $\delta R23b'$ is expressed by Equation 21 below, using Equations 19 and 20.

$$\delta R23b' = 3\delta R \quad \text{(Equation 21)}$$

Accordingly, the y-axis component of the amount of travel of the first rigid member $150B_1$ (second rigid member $150B_2$), which is expressed by Equation 20, is equivalent to the amount of travel of the holding apparatus 100A relative to the reference axis AX. The y-axis component of the amount of travel of the first rigid member $150B_1$ (second rigid member $150B_2$), which is expressed by Equation 20, is also equivalent to the amount of travel of the spherical surfaces of the optical element relative to the reference axis AX in the case where the holding apparatus 100A is not constrained relative to the structure 300.

Referring to FIG. 6C, although the distance between the first rigid member $150B_1$ (second rigid member $150B_2$) and the reference axis AX in the direction perpendicular to the reference axis AX has changed from R23 to R23', the amount of that change is very small and thus can be ignored. R23' is expressed by Equation 22 below.

$$R23' = \text{sqrt}(R23^2 + ((\sqrt{3}/2)\delta y)^2) = \text{sqrt}(R23^2 + 3\delta R^2) \approx R23 \quad \text{(Equation 22)}$$

Figure 7A:
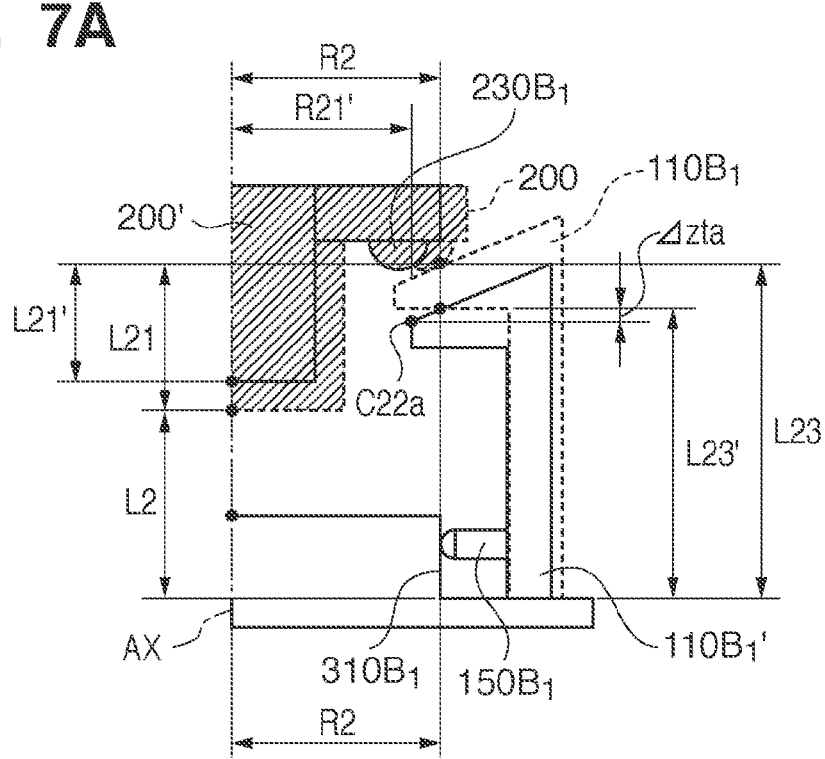
FIGS. 7A and 7B are diagrams illustrating a gradient of an inclined surface of the first holding unit (an inclined surface of a second holding unit) and a gradient of an inclined surface of a third holding unit in the holding apparatus shown in FIGS. 5A to 5C.
Figure 7B:
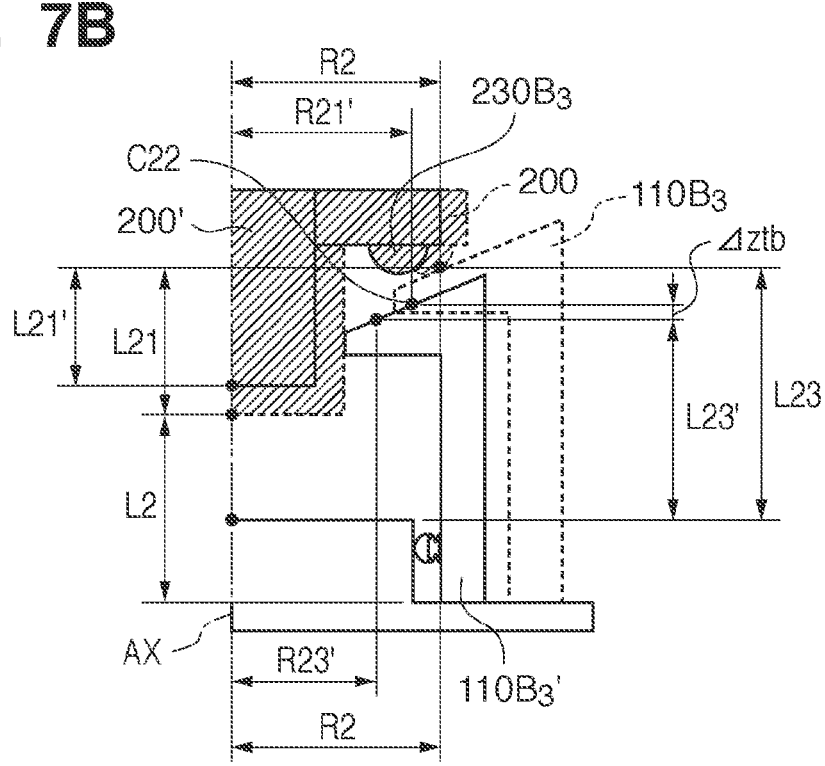

The following is a description of the gradient $\theta_{21}$ of the inclined surface $110B_1a$ of the first holding unit $110B_1$ (the inclined surface of the second holding unit $110B_2$) and the gradient $\theta_{22}$ of the inclined surface $110B_3a$ of the third holding unit $110B_3$ with reference to FIGS. 7A and 7B. FIG. 7A schematically shows states of the optical element 200 and the first holding unit $110B_1$ before and after a temperature change, in the case where the environmental temperature of the holding apparatus 100A has decreased by $\Delta T°$ C. In FIG. 7A, the optical element 200 and the first holding unit $110B_1$ before the temperature change are shown by broken lines, and an optical element 200' and a first holding unit $110B_1'$ after the temperature change are shown by solid lines. FIG. 7B schematically shows states of the optical element 200 and the third holding unit $110B_3$ before and after a temperature change, in the case where the environmental temperature of the holding apparatus 100A has decreased by $\Delta T°$ C. In FIG. 7B, the optical element 200 and the third holding unit $110B_3$ before the temperature change are shown by broken lines, and the optical element 200' and a third holding unit $110B_3'$ after the temperature change are shown by solid lines.

Referring to FIG. 7A, even if the environmental temperature has changed, the first holding unit $110B_1$ is not deformed in the direction perpendicular to the reference axis AX (radial direction) as described above (because the first rigid member 150B$_1$ is in contact with the first reference plane 310B$_1$). On the other hand, if the environmental temperature has changed, the optical element 200 is deformed (shrinks) in the direction perpendicular to the reference axis AX. Accordingly, the first spherical surface 230B$_1$ moves by Δzta in accordance with the contraction of the optical element 200. The relationship between Δzta and the gradient θ$_{21}$ of the inclined surface 110B$_1$a of the first holding unit 110B$_1$ is expressed by Equation 23 below.

$$\Delta zta = (R2-R21') \cdot \tan \theta_{21} \quad \text{(Equation 23)}$$

Here, R2 is the distance between the first reference point P21 and the contact point C21a before the temperature change in the direction perpendicular to the reference axis AX, and R21' is the distance between the first reference point P21 and a contact point C22a after the temperature change in the direction perpendicular to the reference axis AX.

Accordingly, for the first holding unit 110B$_1$, a position L2' at which the first spherical surface 230B$_1$ of the optical element 200 is held is expressed by Equation 24 below.

$$L2' = L23' - L21' - \Delta zta \quad \text{(Equation 24)}$$

In order to prevent the first spherical surface 230B$_1$ from moving before and after the temperature change, L2=L2' needs to be satisfied. Therefore, the gradient θ$_{21}$ of the inclined surface 110B$_1$a of the first holding unit 110B$_1$ needs to satisfy Equation 25 below.

$$\theta_{21} = \tan^{-1} \{(L21 \cdot \alpha_1 - L23 \cdot \alpha_3)/(R2 \cdot Ct_1 \cdot \alpha_1)\} \quad \text{(Equation 25)}$$

Meanwhile, the third spherical surface 230B$_3$ of the optical element 200 held by the third holding unit 110B$_3$ shown in FIG. 7B moves in accordance with δR23b' expressed by Equation 21 when the environmental temperature has changed. The relationship between Δztb and the gradient θ$_{22}$ of the inclined surface 110B$_3$a of the third holding unit 110B$_3$ is expressed by Equation 26 below.

$$\Delta ztb = (R21'-R23') \cdot \tan \theta_{22} = \delta R23b' \cdot \tan \theta_{22} \quad \text{(Equation 26)}$$

Accordingly, for the third holding unit 110B$_3$, the position L2' at which the third spherical surface 230B$_3$ of the optical element 200 is held is expressed by Equation 27 below.

$$L2' = L23' - L21' - \Delta ztb \quad \text{(Equation 27)}$$

In order not to move the third spherical surface 230B$_3$ before and after the temperature change, L2=L2' needs to be satisfied. Accordingly, the gradient θ$_{22}$ of the inclined surface 110B$_3$a of the third holding unit 110B$_3$ needs to satisfy Equation 28 below.

$$\theta_{22} = \tan^{-1} \{(L21 \cdot \alpha_1 - L23 \cdot \alpha_3)/(3R2 \cdot Ct_1 \cdot \alpha_1)\} \quad \text{(Equation 28)}$$

In this way, in the holding apparatus 100A according to the present embodiment, a plurality of holding units that hold the optical element 200 have inclined surfaces having different gradients depending on whether they include a rigid member or a spring member. Note that in the present embodiment, although the structure 300 has three reference planes arranged at regular intervals (spaced 120 degrees), the present invention is not limited to this. Also, in the present embodiment, although the holding units, the rigid member, and the spring member are integrally configured, and the orientation in which the holding units are placed matches the orientation in which the rigid member and the spring member are placed, it is not necessary to match the orientation in which the holding units are placed and the orientation in which the rigid member and the spring member are placed. For example, even if the holding units are placed in the opposite orientation to the rigid member and the spring member, it is possible to define the gradients of the inclined surfaces of the holding units.

The holding apparatus 100A according to the present embodiment can prevent misalignment of the optical element 200 and degradation in the optical performance of the optical element 20 by keeping constant the distance along the reference axis AX between the first reference point P11 and the second reference point P12 before and after a temperature change. However, in the holding apparatus 100A, the optical element 200 is decentered in the direction perpendicular to the reference axis AX before and after a temperature change. From this, the present embodiment is applicable to, for example, a case in which the amount of the above decentering falls within a tolerable range for the optical apparatus, or a case in which a target to be held is an optical element that allows decentering (e.g., a telescopic filter).

<Third Embodiment>

Figure 8:
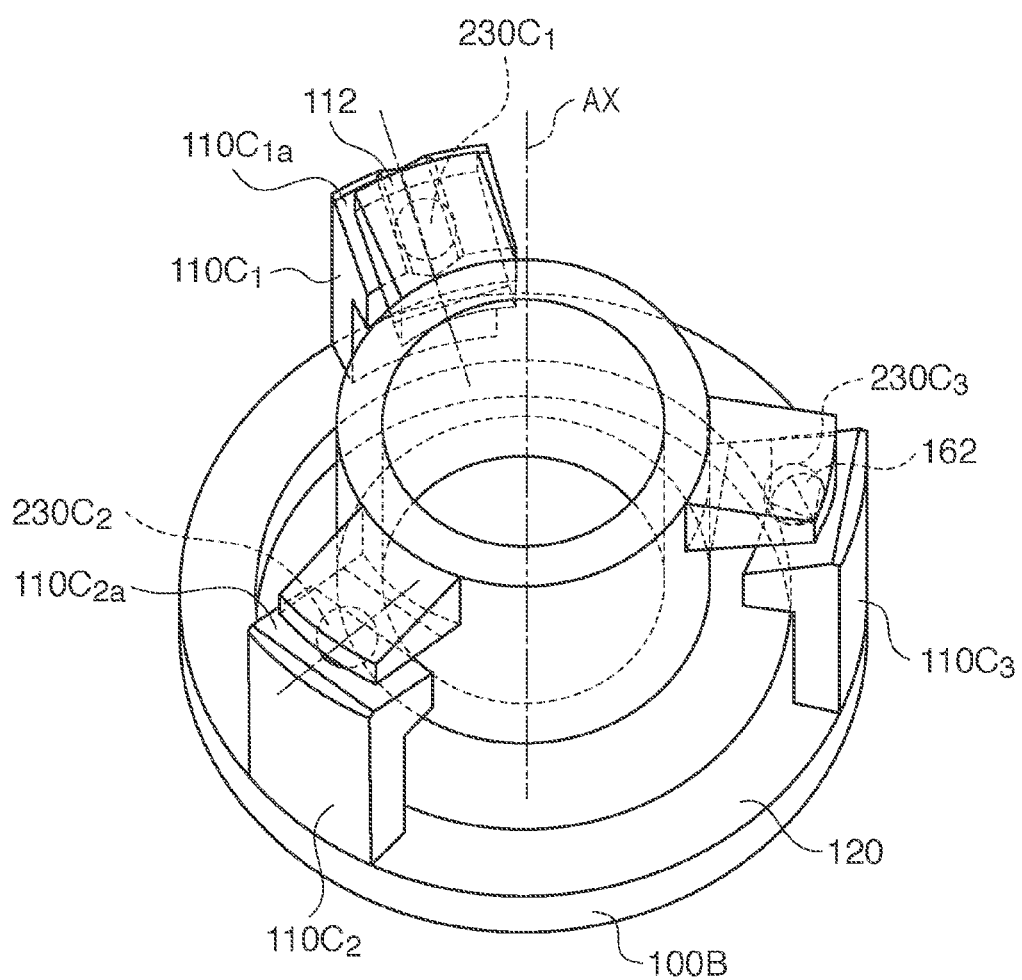
FIG. 8 is a diagram showing the configuration of a holding apparatus according to a third embodiment of the present invention.

A description is given of a holding apparatus 100B according to a third embodiment of the present invention with reference to FIG. 8. The holding apparatus 100B includes a first holding unit 110C$_1$, a second holding unit 110C$_2$, and a third holding unit 110C$_3$.

The first holding unit 110C$_1$ includes a V-shaped groove 112 that defines a first inclined surface 110C$_1$a having a gradient θ$_{31}$ relative to the reference axis AX. A first spherical surface 230C$_1$ of the optical element 200 is in contact with the V-shaped groove 112 at two points. In this way, the first holding unit 110C$_1$ with the V-shaped groove 112 formed therein constrains two degrees of freedom of the optical element 200 having the first spherical surface 230C$_1$.

The second holding unit 110C$_2$ includes a plane (plane portion) that defines a second inclined surface 110C$_2$a having a gradient θ$_{32}$ relative to a plane perpendicular to the reference axis AX. A second spherical surface 230C$_2$ of the optical element 200 is in contact with the plane that defines the second inclined surface 110C$_2$a at a single point. In this way, the second holding unit 110C$_2$ having a plane that defines the second inclined surface 110C$_2$a constrains one degree of freedom of the optical element 200 having the second spherical surface 230C$_2$.

The third holding unit 110C$_3$ includes a conical groove 162 for holding the optical element 200. A third spherical surface 230C$_3$ of the optical element 200 is in contact with the conical groove 162 at three points. In this way, the third holding unit 110C$_3$ with the conical groove 162 formed therein constrains three degrees of freedom of the optical element 200 having the third spherical surface 230C$_3$.

Before and after a temperature change, the conical groove 162 of the third holding unit 110C$_3$ and the third spherical surface 230C$_3$ do not move relatively in a direction parallel to a plane that includes the three contact points, whereas the spherical surfaces of the optical element corresponding to the other holding units move. The other holding units as referred to herein include the first holding unit 110C$_1$ and the second holding unit 110C$_2$.

In the holding apparatus 100B, as described in the first embodiment, the gradients θ$_{31}$ and θ$_{32}$ can be uniquely determined from the amounts of deformation of the optical element 200 and the holding units (the first holding unit 110C$_1$ and the second holding unit 111C$_2$).

Also, as in the second embodiment, the position of the holding apparatus 100B may be constrained kinematically relative to the structure 300, using a rigid member and a spring member. In this case, the gradients θ$_1$ and θ$_{32}$ may be determined in consideration of deformation of the rigid member and the spring member as described in the second embodiment.

The configuration of the present embodiment is particularly effective in the case where the plurality of holding units that hold the target optical element are at different distances from the reference axis. For example, the configuration is effective in the case where when the conical groove portion is located farthest from the reference axis, the displacement of the conical groove portion in the direction parallel to the reference axis due to a temperature change, when converted into an angle relative to the plane perpendicular to the reference axis, is so small that the value can be ignored. On the other hand, when the V-shaped groove portion and the plane portion are located relatively close to the reference axis, their displacement in the direction parallel to the reference axis, when converted into an angle, cannot be ignored. Accordingly, the V-shaped groove portion and the plane portion need to have the gradients $\theta_{31}$ and $\theta_{32}$ as mentioned above so as not to change the position of the optical element in the direction parallel to the reference axis in the corresponding holding units.

<Fourth Embodiment>

A description is given of a reflecting telescope according to a fourth embodiment of the present invention with reference to FIG. 10. A base 866 has the functions of supporting a telescope and changing the orientation of the telescope to the direction of observation, and holds a casing 864 via a joint 865. A main reflecting mirror 867 is arranged on the bottom face of the casing 864. Also, a camera unit lens barrel 862 that is fixed to a frame 863 is arranged on the upper right of the casing 864.

In FIG. 10, light beams incoming to the casing 864 from an upper right celestial body pass by the frame 863 and are reflected by the main reflecting mirror 867. The light beams reflected by the main reflecting mirror 867, which is a parabolic mirror, are focused into a focal point of the main reflecting mirror 867. Note that a camera unit including a lens system 861 for forming an image with high image quality on a solid-state image sensor 869 is arranged in the vicinity of the focal point of the main reflecting mirror 867.

The lens system 861 includes various optical elements and is configured by, for example, an aberration correction system disclosed in Japanese Patent Application Laid-Open No. 6-230274. The main reflecting mirror 867 and at least one optical element included in the lens system 861 are held by the holding apparatus 100, 100A, or 100B. Accordingly, even if temperature has changed depending on the environment in which the telescope is used, misalignment of the optical element (that is, the optical performance of the optical system) can be kept within a tolerance range.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2010-056541 filed on Mar. 12, 2010, which is hereby incorporated by reference herein in its entirety.

What is claimed is:

1. A holding apparatus configured to hold an optical member, the holding apparatus comprising:

a holding member configured to hold the optical member and including a contact surface that contacts with a projection portion of the optical member; and a structure supporting the holding member, wherein the contact surface inclines relative to a plane orthogonal to an optical axis of the optical member, wherein an inclination angle of the contact surface relative to the plane is set so that a relative position of an optical surface of the optical member to the structure is kept constant in a direction parallel to the optical axis when the optical member shrinks or expands, wherein the inclination angle is set based on at least one of a thermal expansion coefficient of the optical member, a shape of the optical member, a thermal expansion coefficient of the holding member, or a shape of the holding member, and wherein a following equation is satisfied:

$$\theta_1 = \tan^{-1}\{(L13 \cdot \alpha_3 - L11 \cdot \alpha_1)/(R1 \cdot (Ct_3 \cdot \alpha_3 - Ct_1 \cdot \alpha_1))\},$$

where $\alpha_1$ is the thermal expansion coefficient of the optical member, $\alpha_3$ is the thermal expansion coefficient of the holding member, R1 is a distance from the optical axis to a contact point, at the contact point the contact surface of the holding member contacting with the projection portion of the optical member, at a temperature in a direction orthogonal to the optical axis, L11 is a distance from the contact point to the optical surface of the optical member at the temperature in the direction parallel to the optical axis, L13 is a distance from the contact point a reference surface of the structure, the reference surface formed in a side near the optical member, at the temperature in the direction parallel to the optical axis, $Ct_1$ is a shape coefficient of the optical member, $Ct_3$ is a shape coefficient of the holding member, and $\theta_1$ is the inclination angle.

2. The apparatus according to claim 1, wherein:

the holding member has a V-groove portion or a plane portion that constitutes the contact surface, and the projection portion of the optical member has a spherical surface portion that contacts with the V-groove portion or the plane portion.

3. The apparatus according to claim 1, wherein the holding member includes a pressing member that presses the optical member and the contact surface against each other in a direction orthogonal to the contact surface.

4. The apparatus according to claim 1, wherein:

the holding member include a first holding member, a second holding member, and a third holding member, the first holding member is in contact with a first reference plane of the structure in a direction orthogonal to a reference axis, the second holding member is in contact with a second reference plane of the structure in a direction orthogonal to the reference axis, the third holding member includes a compression spring that is in contact with a third reference plane of the structure in a direction orthogonal to the reference axis, and the contact surface of the third holding member has an inclination angle different from those of the contact surfaces of the first holding member and the second holding member.

5. The apparatus according to claim 1, wherein:

the holding member includes a first holding member having a first V-groove portion, a second holding member having a second V-groove portion, and a third holding member having a third V-groove portion, the projection portion of the optical member includes a first spherical surface portion that contacts with the first V-groove portion at two points, a second spherical surface portion that contacts with the second V-groove portion at two points, and a third spherical surface portion that contacts with the third V-groove portion at two points, the contact surface of the first holding member is defined by a plane that includes two straight lines as loci of the two points formed by the first spherical surface portion moving along the first V-groove portion, the contact surface of the second holding member is defined by a plane that includes two straight lines as loci of the two points formed by the second spherical surface portion moving along the second V-groove portion, and the contact surface of the third holding member is defined by a plane that includes two straight lines as loci of the two points formed by the third spherical surface portion moving along the third V-groove portion.

6. The apparatus according to claim 1, wherein:

the holding member includes:
  a first holding member having a V-groove portion constituting the contact surface; and
  a second holding member having a plane portion constituting the contact surface, the apparatus further comprises a third holding member supported by the structure, including a conical groove portion, and configured to hold the optical member via the conical groove portion, and the projection portion of the optical member includes a first spherical surface portion that contacts with the V-groove portion at two points, a second spherical surface portion that contacts with the plane portion at a single point, and a third spherical surface portion that contacts with the conical groove portion at three points.

7. The apparatus according to claim 1, wherein:

the holding member includes a first contact surface that contacts with the projection portion of the optical member at a first contact point and a second contact surface that contacts with the projection portion of the optical member at a second contact point, the first contact point and the second contact point exist within a surface of the contact surface, and an orthogonal plane to the first contact surface and the second contact surface crosses aslant to the optical axis.

8. An optical apparatus comprising:

an optical member;

a holding member configured to hold the optical member, and including a contact surface that contacts with a projection portion of the optical member; and a structure supporting the holding member, wherein the contact surface inclines relative to a plane orthogonal to an optical axis of the optical member, wherein an inclination angle of the contact surface relative to the plane is set so that a relative position of an optical surface of the optical member to the structure is kept constant in a direction parallel to the optical axis when the optical member shrinks or expands, wherein the inclination angle is set based on at least one of a thermal expansion coefficient of the optical member, a shape of the optical member, a thermal expansion coefficient of the holding member, or a shape of the holding member, and wherein a following equation is satisfied:

$$\theta_1 = \tan^{-1}\{(L13 \cdot \alpha_3 - L11 \cdot \alpha_1)/(R1 \cdot (Ct_3 \cdot \alpha_3 - Ct_1 \cdot \alpha_1))\},$$

where $\alpha_1$ is the thermal expansion coefficient of the optical member, $\alpha_3$ is the thermal expansion coefficient of the holding member, $R1$ is a distance from the optical axis to a contact point, at the contact point the contact surface of the holding member contacting with the projection portion of the optical member, at a temperature in a direction orthogonal to the optical axis, $L11$ is a distance from the contact point to the optical surface of the optical member at the temperature in the direction parallel to the optical axis, $L13$ is a distance from the contact point a reference surface of the structure, the reference surface formed in a side near the optical member, at the temperature in the direction parallel to the optical axis, $Ct_1$ is a shape coefficient of the optical member, $Ct_3$ is a shape coefficient of the holding member, and $\theta_1$ is the inclination angle.

9. A telescope comprising:

an optical member;

a holding member configured to hold the optical member, and including a contact surface that contacts with a projection portion of the optical member; and a structure supporting the holding member, wherein the contact surface inclines relative to a plane orthogonal to an optical axis of the optical member, wherein an inclination angle of the contact surface relative to the plane is set so that a relative position of an optical surface of the optical member to the structure is kept constant in a direction parallel to the optical axis when the optical member shrinks or expands, wherein the inclination angle is set based on at least one of a thermal expansion coefficient of the optical member, a shape of the optical member, a thermal expansion coefficient of the holding member, or a shape of the holding member, and wherein a following equation is satisfied:

$$\theta_1 = \tan^{-1}\{(L13 \cdot \alpha_3 - L11 \cdot \alpha_1)/(R1 \cdot (Ct_3 \cdot \alpha_3 - Ct_1 \cdot \alpha_1))\},$$

where $\alpha_1$ is the thermal expansion coefficient of the optical member, $\alpha_3$ is the thermal expansion coefficient of the holding member, $R1$ is a distance from the optical axis to a contact point, at the contact point the contact surface of the holding member contacting with the projection portion of the optical member, at a temperature in a direction orthogonal to the optical axis, $L11$ is a distance from the contact point to the optical surface of the optical member at the temperature in the direction parallel to the optical axis, $L13$ is a distance from the contact point a reference surface of the structure, the reference surface formed in a side near the optical member, at the temperature in the direction parallel to the optical axis, $Ct_1$ is a shape coefficient of the optical member, $Ct_3$ is a shape coefficient of the holding member, and $\theta_1$ is the inclination angle.

10. A holding apparatus configured to hold an object, the holding apparatus comprising:

a plurality of holding members each including an inclined surface that is inclined relative to a plane orthogonal to a reference axis and configured to hold the object via the inclined surfaces thereof; and a structure supporting the plurality of holding members, wherein the inclined surfaces of the plurality of holding members each are inclined in respective planes including the reference axis so that the distance falls within a tolerance even if temperature of the object and the plurality of holding members changes, wherein the inclination angles of the inclined surfaces each are set based on a thermal expansion coefficient and shape of the object and a thermal expansion coefficient and a shape of each of the plurality of holding members, so that the distance falls within the tolerance even if the temperature of the object and the plurality of holding members change, and wherein, for each of the plurality of holding members, a following equation is satisfied:

$$\theta_1 = \tan^{-1}\{(L13 \cdot \alpha_3 - L11 \cdot \alpha_1)/(R1 \cdot (Ct_3 \cdot \alpha_3 - Ct_1 \cdot \alpha_1))\},$$

where $\alpha_1$ is the thermal expansion coefficient of the object, $\alpha_3$ is the thermal expansion coefficient of the holding member, R1 is a distance from the reference axis to a contact point between the inclined surface and the object at a temperature, L11 is a distance between the contact point and a plane that includes the reference point of the object and is orthogonal to the reference axis at the temperature, L13 is a distance between the contact point and a plane that includes the reference point of the structure and is orthogonal to the reference axis at the temperature, $Ct_1$ is a shape coefficient of the object, $Ct_3$ is a shape coefficient of the holding member, and $\theta_1$ is the inclination angle.

11. A holding apparatus configured to hold an object, the holding apparatus comprising:
a plurality of holding members each including an inclined surface that is inclined relative to a plane orthogonal to a reference axis and configured to hold the object via the inclined surfaces thereof; and
a structure supporting the plurality of holding members,
wherein the inclined surfaces each are inclined so that the distance falls within a tolerance even if temperature of the object and the plurality of holding members change,
wherein the inclination angles of the inclined surfaces each are set based on a thermal expansion coefficient and a shape of the object and a thermal expansion coefficient and a shape of each of the plurality of holding members, so that the distance falls within the tolerance even if the temperature of the object and the plurality of holding members change, and
wherein, for each of the plurality of holding members, a following equation is satisfied:

$$\theta_1 = \tan^{-1}\{(L13 \cdot \alpha_3 - L11 \cdot \alpha_1)/(R1 \cdot (Ct_3 \cdot \alpha_3 - Ct_1 \cdot \alpha_1))\},$$

where $\alpha_1$ is the thermal expansion coefficient of the object, $\alpha_3$ is the thermal expansion coefficient of the holding member, R1 is a distance from the reference axis to a contact point between the inclined surface and the object at a temperature, L11 is a distance between the contact point and a plane that includes the reference point of the object and is orthogonal to the reference axis at the temperature, L13 is a distance between the contact point and a plane that includes the reference point of the structure and is orthogonal to the reference axis at the temperature, $Ct_1$ is a shape coefficient of the object, $Ct_3$ is a shape coefficient of the holding member, and $\theta_1$ is the inclination angle.

* * * * *